US011597306B2

(12) United States Patent
Lee et al.

(10) Patent No.: US 11,597,306 B2
(45) Date of Patent: Mar. 7, 2023

(54) MULTI-FUNCTIONAL DOOR AND VEHICLE INCLUDING THE SAME

(71) Applicants: HYUNDAI MOTOR COMPANY, Seoul (KR); KIA MOTORS CORPORATION, Seoul (KR)

(72) Inventors: Sang Heon Lee, Seoul (KR); Jin Ho Hwang, Cheonan-si (KR); Dong Eun Cha, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 162 days.

(21) Appl. No.: 17/154,623

(22) Filed: Jan. 21, 2021

(65) Prior Publication Data
US 2022/0063458 A1 Mar. 3, 2022

(30) Foreign Application Priority Data
Sep. 3, 2020 (KR) .......................... 10-2020-0112335

(51) Int. Cl.
*B60N 2/30* (2006.01)
*B60J 5/10* (2006.01)
(Continued)

(52) U.S. Cl.
CPC .............. *B60N 2/304* (2013.01); *B60J 5/105* (2013.01); *B60N 2/3002* (2013.01); *B60J 5/10* (2013.01); *B60N 2/20* (2013.01); *B60N 3/001* (2013.01)

(58) Field of Classification Search
CPC ........ B60N 2/304; B60N 2/3002; B60N 2/30; B60N 2/20; B60N 2/3095; B60N 3/001; B60J 5/105; B60J 5/106; B60J 5/104
(Continued)

(56) References Cited

U.S. PATENT DOCUMENTS 1,210,789 A * 1/1917 Freedman ............ B60N 2/3011
49/70
1,759,878 A * 5/1930 Zizzo ................... B60N 2/3043
248/240.4
(Continued)

FOREIGN PATENT DOCUMENTS

JP H08324455 A * 12/1996 ........... B60N 2/3095
JP 10-192056 A 7/1998
(Continued)

OTHER PUBLICATIONS

Korean Office Action Report dated Dec. 24, 2021, issued in corresponding Korean Patent Application No. 10-2020-0112335.
(Continued)

*Primary Examiner* — Jason S Morrow
*Assistant Examiner* — Wenwei Zhuo
(74) *Attorney, Agent, or Firm* — Morgan, Lewis & Bockius LLP

(57) ABSTRACT

A multi-functional door for a vehicle includes a door body disposed on one side of the vehicle and configured to be opened or closed. The door body has an inner side surface facing an indoor space of the vehicle and an outer side surface facing the outside of the vehicle. The multi-functional door further includes a door seat that is coupled to the inner side surface of the door body and is configured to be enclosed in or unfolded from the door body.

11 Claims, 4 Drawing Sheets

(51) Int. Cl.
  *B60N 2/20* (2006.01)
  *B60N 3/00* (2006.01)
(58) Field of Classification Search
  USPC .......... 296/146.11, 146.13, 146.8, 65.06, 69
  See application file for complete search history.

(56) References Cited

U.S. PATENT DOCUMENTS

| | | | | |
|---|---|---|---|---|
| 3,151,906 | A * | 10/1964 | Roberts | B60N 2/3047 297/15 |
| 4,226,462 | A * | 10/1980 | Wellett | B60N 2/245 296/68 |
| 5,421,124 | A * | 6/1995 | Zuccaro | E05F 5/025 49/70 |
| 5,540,539 | A * | 7/1996 | Wolfman | A61G 3/062 414/921 |
| 6,116,676 | A * | 9/2000 | Edwards | B60N 2/3047 296/65.09 |
| 6,502,885 | B1 * | 1/2003 | Gammon | B60R 7/02 224/511 |
| 6,547,303 | B1 * | 4/2003 | Anderson | B60N 2/14 297/344.21 |
| 7,404,505 | B2 * | 7/2008 | Walther | A61G 3/0209 224/407 |
| 10,328,860 | B2 * | 6/2019 | Lewis | B60J 5/105 |
| 2004/0222657 | A1 * | 11/2004 | Welch | B60J 5/101 296/68 |
| 2005/0017532 | A1 | 1/2005 | Oyama | |
| 2006/0152029 | A1 * | 7/2006 | Tomasson | B60J 5/105 296/51 |
| 2007/0222251 | A1 * | 9/2007 | Abraham | B60N 2/3047 297/344.21 |
| 2008/0277956 | A1 * | 11/2008 | Karuppaswamy | B60R 5/041 296/37.1 |
| 2009/0242700 | A1 | 10/2009 | Raymond | |
| 2010/0060026 | A1 * | 3/2010 | Bowers | B60N 2/309 297/378.12 |
| 2013/0300145 | A1 * | 11/2013 | Otake | B60N 2/3011 296/65.09 |
| 2015/0239372 | A1 | 8/2015 | Bauer | |
| 2018/0251042 | A1 * | 9/2018 | Baccouche | E06B 7/28 |
| 2019/0232844 | A1 * | 8/2019 | Hoggarth | B62D 25/20 |
| 2021/0378890 | A1 * | 12/2021 | Bouzige | B60N 3/06 |

FOREIGN PATENT DOCUMENTS

| | | | | |
|---|---|---|---|---|
| JP | 10192056 | A * | 7/1998 | B60J 5/10 |
| JP | 2003-204994 | A | 7/2003 | |
| JP | 2003204994 | A * | 7/2003 | |
| JP | 2009-536541 | A | 10/2009 | |
| KR | 20-1998-0033414 | U | 9/1998 | |
| KR | 10-0383938 | A | 5/2003 | |
| KR | 10-2009-0126546 | A | 12/2009 | |
| WO | 2002/055332 | A1 | 7/2002 | |
| WO | 2007/132216 | A1 | 11/2007 | |

OTHER PUBLICATIONS

Notice of Allowance dated Oct. 24, 2022, issued in corresponding Korean Patent Application No. 10-2020-0112335.

* cited by examiner

MULTI-FUNCTIONAL DOOR AND VEHICLE INCLUDING THE SAME

CROSS REFERENCE TO RELATED APPLICATION

The present application claims the benefit of priority to Korean Patent Application No. 10-2020-0112335, filed Sep. 3, 2020 in the Korean Intellectual Property Office, the entire contents of which is incorporated herein for all purposes by this reference.

TECHNICAL FIELD

The present disclosure relates to a multi-functional door configured to be rotatably opened in a transverse direction of a vehicle such that a door seat is housed in a door body and is unfolded when the door is opened, and a vehicle including the multi-functional door.

BACKGROUND

A tailgate of a vehicle means a rear door of the vehicle, and passengers may open the tailgate to load a luggage or may use the tailgate as a passage to get in or out of the vehicle. The tailgate can be opened in various manners, and usually, a clamshell type tailgate is widely used. In a case of the clamshell type tailgate, such a tailgate door can be opened upward, and thus, it is possible to secure an indoor space of the vehicle and easily load a luggage.

However, a vehicle is not only used for a transportation purpose, but it can also be used for providing a rest area. In addition, a vehicle can be used for various activities such as camping, in a manner of connecting an indoor space of the vehicle and an outdoor space of the vehicle. In this case, the clamshell type tailgate has been generally used in a manner in which a door is opened such that a passenger can sit on a floor of the vehicle.

Accordingly, there is a need to develop a door that not only serves to open and close a passage connected to the outside in a vehicle, but also assists in various activities by being connected to an outdoor space.

The contents described as the related art have been provided only to assist in understanding the background of the present disclosure and should not be considered as corresponding to the related art known to those having ordinary skill in the art.

SUMMARY

An object of the present disclosure is to provide a multi-functional door for a vehicle having a door body, in which a seat is embedded and unfolded at the outside of the vehicle, configured to be opened, and a vehicle including the multi-functional door, in which the multi-functional door is opened to allow communication between an indoor space of the vehicle and an outdoor space of the vehicle, such that a passenger may use a more widely expanded space for various purposes.

According to an embodiment of the present disclosure, a multi-functional door includes: a door body disposed on one side of a vehicle and configured to be opened or closed, the door body having an inner side surface facing an indoor space of the vehicle and an outer side surface facing the outside of the vehicle; and a door seat that is coupled to the inner side surface of the door body and is configured to be housed in or unfolded from the door body.

The door seat may be unfolded in a manner in which a seat cushion housed in the door body rotates downward, and a seatback may be positioned in the inner side surface of the door body after the door seat is unfolded.

As the seat cushion of the door seat slides forward in a state where the door seat is unfolded, a slope of the seatback is changed, such that a reclining seat may be implemented.

A door seat support may be provided on the seat cushion of the door seat, the door seat support may be housed in or unfolded from the door cushion, and when the door seat support is unfolded in a state where the door seat is unfolded, a lower end of the door seat support is supported by the ground, such that a load of the door seat may be supported.

A door body support may be provided on a lower end portion of the door body, the door body support may be housed in or unfolded from the door body, and when the door body support is unfolded in a state where the door body is opened, a lower end of the door body support is supported by the ground, such that a load of the door body may be supported.

A connecting portion connecting the door body and a vehicle body may be provided at an end of the door body that faces the vehicle body, and the door body may rotate to be opened or closed in a transverse direction of the vehicle based on the connecting portion.

The connecting portion may be extended toward the outside of the vehicle in a state where the door body is opened, such that a position of the door body or door seat may become distant from the vehicle.

A door table or a door cabinet may be provided in the inner side surface of the door body, and the door table or the door cabinet may be housed in or unfolded from the door body.

According to another embodiment of the present disclosure, a vehicle including a multi-functional door, which includes a door body disposed on one side of the vehicle and configured to be open or closed, wherein the door body has an inner side surface facing an indoor space of the vehicle and an outer side surface facing the outside of the vehicle; and a door seat coupled to the inner side surface of the door body and configured to be stored in or unfolded from the door body, includes: a housed seat housed in a floor of the indoor space of the vehicle, or unfolded from the floor, wherein the housed seat is arranged to face the door body of the vehicle when being unfolded.

The housed seat may be unfolded in a manner in which a seatback housed in the floor rotates upward, and a seat cushion may be positioned on the floor after the housed seat is unfolded.

As the seat cushion of the housed seat slides forward in a state where the housed seat is unfolded, a slope of the seatback is changed, such that a reclining seat may be implemented.

A housed table may be provided in the floor of the indoor space of the vehicle, and the housed table may be housed in or unfolded from the floor and may be arranged to face the door body of the vehicle when being unfolded.

A tailgate of the vehicle may be implemented by two multi-functional doors arranged as double doors, and the multi-functional doors may rotate to be opened or closed in a transverse direction at a rear side of the vehicle.

DETAILED DESCRIPTION OF THE EMBODIMENTS

Figure 1:
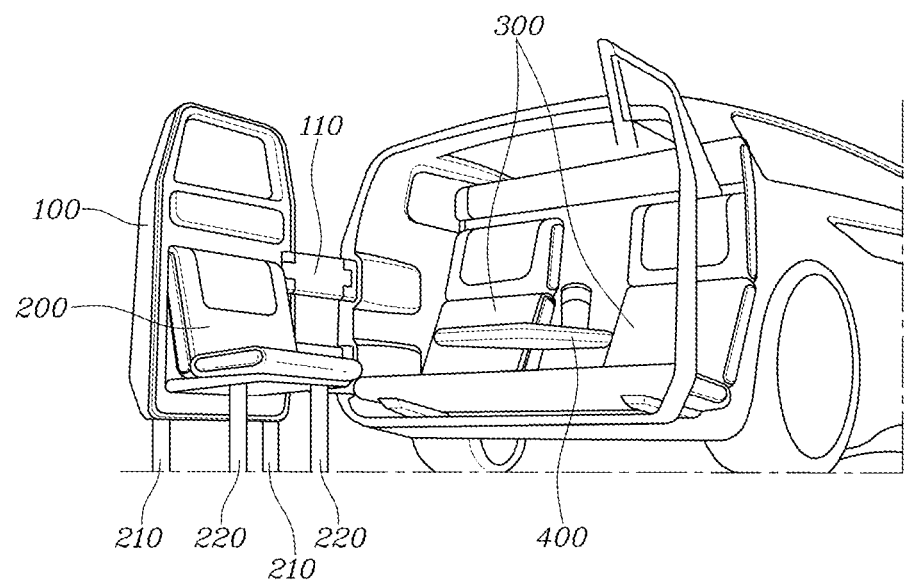
FIG. 1 is a view illustrating a state where a multi-functional door according to an embodiment of the present disclosure is opened in a vehicle including the multi-functional door.

FIG. 1 is a view illustrating a state where a multi-functional door according to an embodiment of the present disclosure is opened in a vehicle including the multi-functional door.

Figure 2:
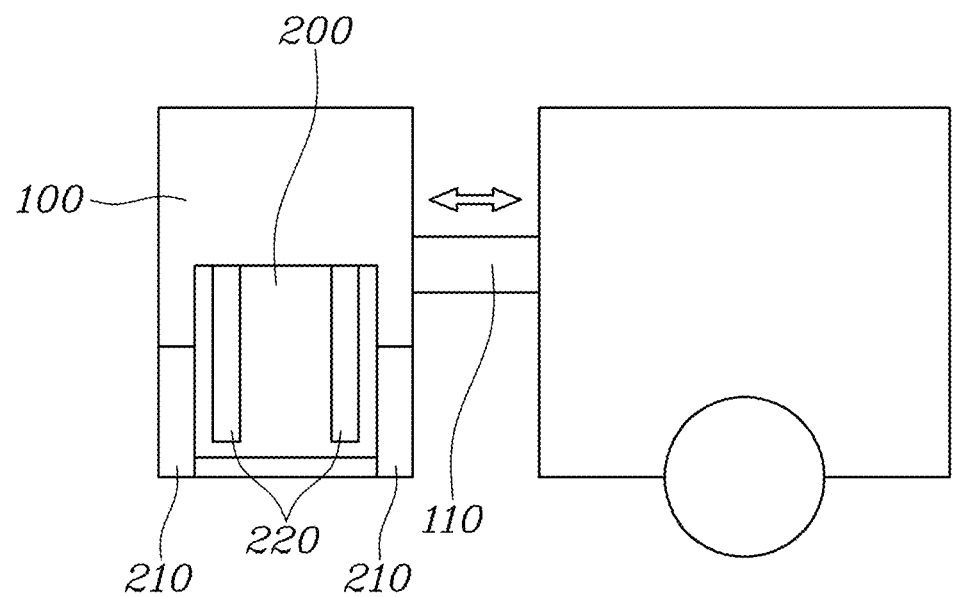
FIG. 2 is a side view illustrating a state where the multi-functional door according to an embodiment of the present disclosure is opened in the vehicle including the multi-functional door.

FIG. 2 is a side view illustrating a state where the multi-functional door according to an embodiment of the present disclosure is opened in the vehicle including the multi-functional door.

Figure 3:
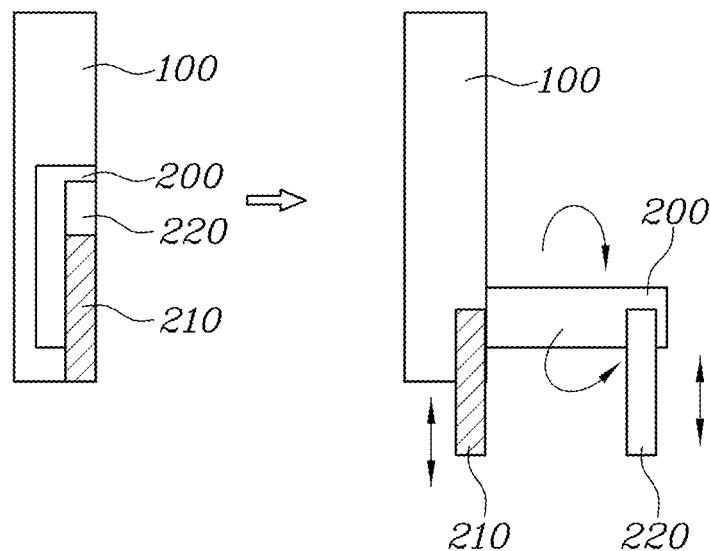
FIG. 3 is a view illustrating a state where a door seat of the multi-functional door according to an embodiment of the present disclosure is unfolded, and a door seat support and a door body support are unfolded.

FIG. 3 is a view illustrating that a door seat of the multi-functional door according to an embodiment of the present disclosure is unfolded, and a door seat support and a door body support are unfolded.

Figure 4:
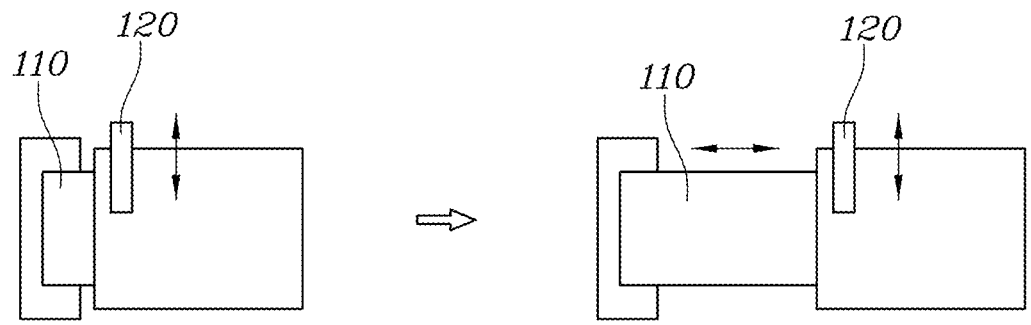
FIG. 4 is a view illustrating a state where the door body of the multi-functional door according to an embodiment of the present disclosure becomes distant from the vehicle as a connecting portion is extended.

FIG. 4 is a view illustrating a state where the door body of the multi-functional door according to an embodiment of the present disclosure becomes distant from the vehicle as a connecting portion is extended.

Figure 5:
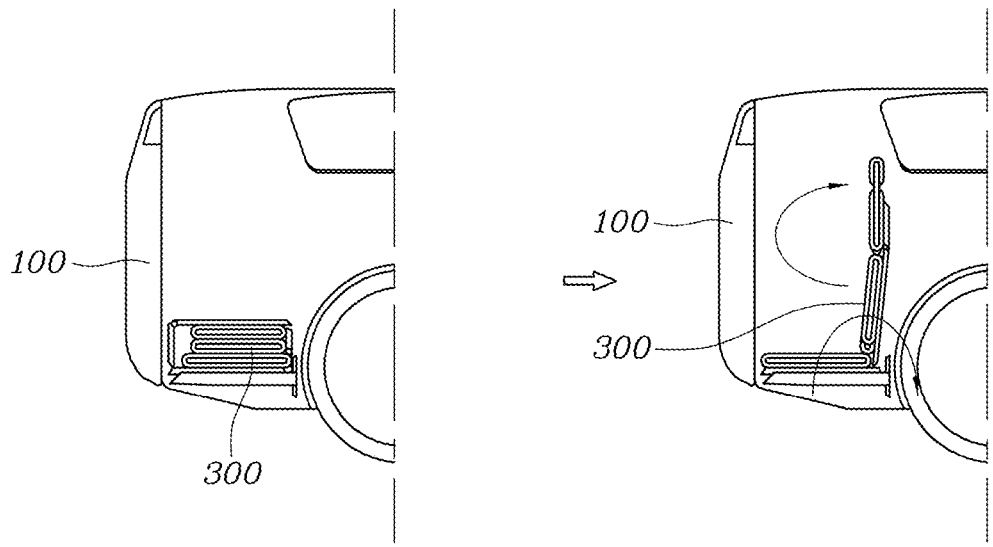
FIG. 5 is a view illustrating a state where a housed seat is unfolded in the vehicle including the multi-functional door according to an embodiment of the present disclosure.

FIG. 5 is a view illustrating a state where a housed seat is unfolded in the vehicle including the multi-functional door according to an embodiment of the present disclosure.

Figure 6:
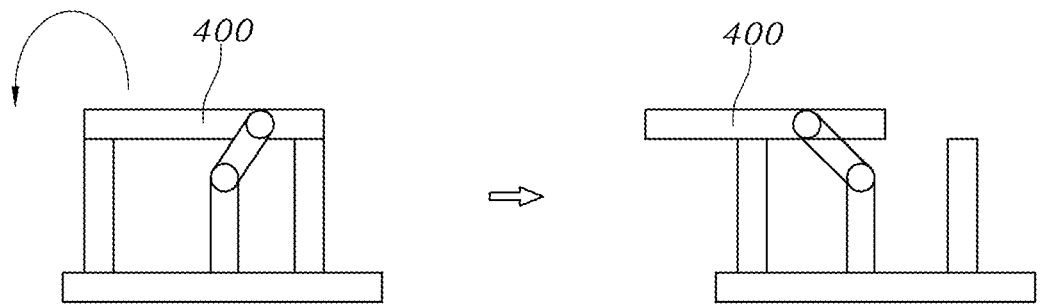
FIG. 6 is a view illustrating a state where a housed table is unfolded in the vehicle including the multi-functional door according to an embodiment of the present disclosure.

FIG. 6 is a view illustrating a state where a housed table is unfolded in the vehicle including the multi-functional door according to an embodiment of the present disclosure.

Figure 7:
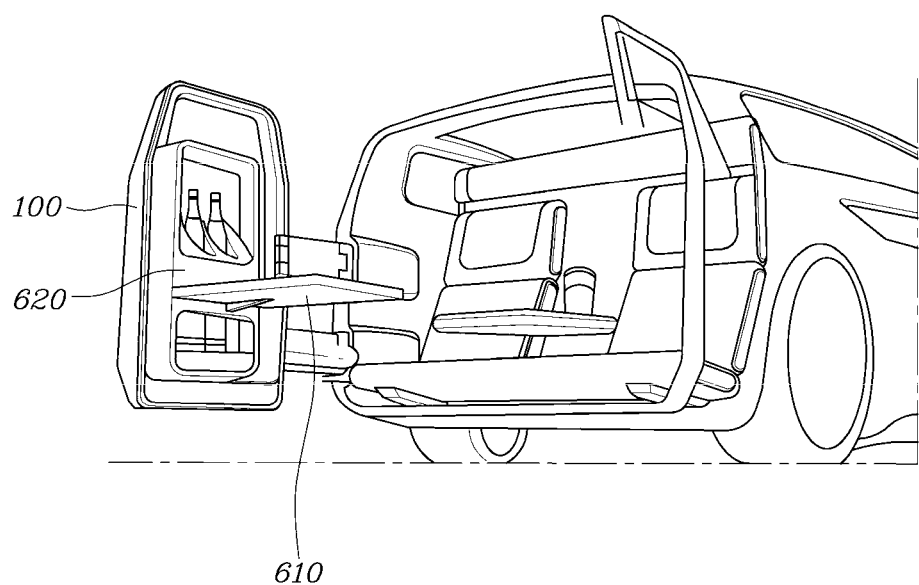
FIG. 7 is a view illustration a state where a door table and a door cabinet is unfolded in the vehicle including the multi-functional door according to an embodiment of the present disclosure.

FIG. 7 is a view illustration a state where a door table and a door cabinet is unfolded in the vehicle including the multi-functional door according to an embodiment of the present disclosure. FIG. 1 is a view illustrating a state where a multi-functional door according to an embodiment of the present disclosure is opened in a vehicle including the multi-functional door. The multi-functional door according to an embodiment of the present disclosure includes: a door body 100 that is provided on one side of a vehicle, is opened or closed, and has an inner side surface facing an indoor space of the vehicle and an outer side surface facing the outside of the vehicle; and a door seat 200 that is coupled to the inner side surface of the door body 100 and is housed in or unfolded from the door body 100.

Unlike an existing clamshell type tailgate which is opened upward, the multi-functional door according to an embodiment of the present disclosure may be opened in a transverse direction. As the door body 100 is opened in the transverse direction, the door seat 200 embedded in the door body 100 is unfolded, such that a passenger may use the door seat 200 at the outside of the vehicle. Therefore, the passenger may use the seat in a wider outdoor space, as compared with a case where the existing clamshell type tailgate of the vehicle is opened and the passenger simply sits on a floor of the vehicle. As a result, the passenger may make a wider space as necessary by connecting the indoor space and the outdoor space of the vehicle, which enables more various activities using a vehicle. FIG. 7 is a view illustration a state where a door table and a door cabinet is unfolded in the vehicle including the multi-functional door according to an embodiment of the present disclosure. In the multi-functional door according to an embodiment of the present disclosure, a door table 610 or a door cabinet 620 is provided in the inner side surface of the door body 100, and the door table 610 or the door cabinet 620 may be housed in or unfolded from the door body 100. The door seat 200 is housed in the inner side surface of the door body 100, and the door table 610 or the door cabinet 620 may be provided in a state where the door seat 200 is housed, or a state where the door seat 200 is removed from the door body 100. When the door table 610 is unfolded, the passenger may freely use the door table 610 outside the vehicle when necessary. The door cabinet 620 may not only be a general storage, but also be a refrigerator or heating cabinet. The door cabinet 620 may be housed in the door body 100 and used in various manners for convenience of passengers.

FIG. 2 is a side view illustrating a state where the multi-functional door according to an embodiment of the present disclosure is opened in the vehicle including the multi-functional door. FIG. 3 is a view illustrating that a door seat of the multi-functional door according to an embodiment of the present disclosure is unfolded, and a door seat support and a door body support are unfolded. In the multi-functional door according to an embodiment of the present disclosure, the door seat 200 is unfolded in a manner in which a seat cushion housed in the door body 100 rotates downward, and a seatback may be positioned in the inner side surface of the door body 100 after the door seat 200 is unfolded.

Specifically, the door seat 200 may be housed in the door body 100, and the passenger may unfold the door seat 200 and use it outside the vehicle when necessary. The seat cushion of the door seat 200 may be positioned in the inner side surface of the door body 100 when being housed, and rotate downward to face the ground when being unfolded, such that the passenger may sit thereon. The passenger may utilize the door body 100 as the seatback, or as the seat cushion rotates, the seatback received in the door body 100 may be exposed to the front side and used.

Further, in the multi-functional door according to an embodiment of the present disclosure, as the seat cushion of the door seat 200 slides forward in a state where the door seat 200 is unfolded, the slope of the seatback is changed, such that a reclining seat may be implemented. As the seat cushion slides forward, a lower end portion of the seatback slides forward together with the seat cushion, and as a result, the slope of the seatback is changed. Therefore, the passenger may adjust the slope of the seatback as he/she prefers by sliding the seat cushion forward.

In the multi-functional door according to an embodiment of the present disclosure, a door seat support 220 is provided on the seat cushion of the door seat 200. The door seat support 220 may be housed in or unfolded from the door cushion, and when the door seat support 220 is unfolded in a state where the door seat 200 is unfolded, a lower end of the door seat support 220 is supported by the ground, such that the load of the door seat 200 may be supported.

The door seat support 220 may be housed in each of opposite ends of the seat cushion of the door seat 200, and unfolded downward and supported by the ground when the door seat 200 is unfolded. Since the length of the door seat support 220 may be adjusted as needed, the door seat support 220 may support the door seat 200 in various environments. As a result, when the passenger sits on the door seat 200 or a load is applied to the door seat 200, the door seat support 220 provided on a lower portion of the door seat 200 may be used to support the door seat 200, such that a damage of the door seat 200 may be prevented. Since the door seat 200 is positioned on the door body 100, when the passenger sits on the door seat 200 or a load is applied to the door seat 200, a large load may be applied to the door body 100 as well in a direction toward the ground. In this case, the door seat support 220 may reduce the load applied to the door body 100.

Further, in the multi-functional door according to an embodiment of the present disclosure, a door body support 210 is provided on a lower end portion of the door body 100. The door body support 210 may be housed in or unfolded from the door body 100, and when the door body support 210 is unfolded in a state where the door body 100 is opened, a lower end of the door body support 210 is supported by the ground, such that the load of the door body 100 may be supported.

Similar to the door seat support 220, when the door body 100 is opened, the door body 100 may be damaged due to the weight of the door body 100, the weight of the door table 610 or door cabinet 620 provided in the door body 100, or a load applied to the door seat 200 when the door seat 200 is unfolded. In order to prevent such a damage, the door body support 210 may be housed in each of opposite ends of the lower end portion of the door body 100 and may be unfolded downward to be supported by the ground when the door body 100 is opened. In addition, the length of the door body support 210 may be adjusted, and thus the door body support 210 may support the load of the door body 100 in various environments. As a result, the door body support 210 may support the load of the door body 100, and support the load of the door seat 200 and the door body 100 together with the door seat support 220 when the door seat 200 is unfolded.

FIG. 4 is a view illustrating a state where the door body of the multi-functional door according to an embodiment of the present disclosure becomes distant from the vehicle as a connecting portion is extended. In the multi-functional door according to an embodiment of the present disclosure, a connecting portion 110 connecting the door body 100 and a vehicle body is provided at an end of the door body 100 that faces the vehicle body. The door body 100 may rotate to be opened or closed in a transverse direction of the vehicle based on the connecting portion 110. In the multi-functional door according to an embodiment of the present disclosure, the door body 100 rotates to be opened in the transverse direction of the vehicle, rather than rotating upward. Therefore, the door body 100 is connected to a side surface of the vehicle body through the connecting portion such as a hinge.

In addition, the connecting portion 110 is extended toward the outside of the vehicle in a state where the door body 100 is opened, such that the position of the door body 100 or door seat 200 may become distant from the vehicle. The connecting portion 110 may be implemented by a general hinge. When the door body 100 is closed, the hinge may be inserted into the vehicle body, and when the door body 100 is opened, a portion of the hinge that is inserted into the vehicle body may slide and protrude toward the outside of the vehicle. As the connecting portion 110 is extended, the door body 100 coupled to the connecting portion 110 also moves toward the outside of the vehicle, and the door body 100 becomes distant from the vehicle. As a result, the passenger may use a more widely expanded space outside the vehicle when the door body 100 is opened, and since there is a clearance from the vehicle body when the door body 100 or door seat 200 is used outside the vehicle, it is possible to avoid interference with the vehicle body or components in the vehicle body.

A fixing portion 120 is provided on one side of the vehicle body that is coupled to the connecting portion 110. After the connecting portion 110 is extended or is inserted into the vehicle body again, the fixing portion 120 may fix the connecting portion 110, such that the door body 100 is also fixed and used in an opened state or closed.

FIG. 5 is a view illustrating a state where a housed seat is unfolded in the vehicle including the multi-functional door according to an embodiment of the present disclosure. The vehicle including the multi-functional door according to an embodiment of the present disclosure includes a housed seat 300 housed in the floor of the indoor space of the vehicle, or unfolded from the floor. The housed seat 300 is arranged to face the door body 100 of the vehicle when being unfolded. Further, the housed seat 300 is unfolded in a manner in which a seatback housed in the floor rotates upward, and a seat cushion may be positioned on the floor after the housed seat 300 is unfolded.

In the vehicle including the multi-functional door according to an embodiment of the present disclosure, the multi-functional door rotates to be opened in the transverse direction of the vehicle, such that an outdoor space of the vehicle is expanded. For utilizing such an outdoor space, an additional seat may be provided in the vehicle. Therefore, the housed seat 300 is provided in the floor of the vehicle including the multi-functional door according to an embodiment of the present disclosure, and the housed seat 300 is unfolded in a state where the door body 100 of the multi-functional door is opened, such that multiple passengers may use the seats of the vehicle in the expanded outdoor space.

The housed seat 300 is housed in the floor of the vehicle in a state where the seatback is folded. As the seatback is unfolded while rotating upward, the seat cushion is exposed to the upper side, and the housed seat 300 is arranged to face the door body 100. In a case where the door seat 200 of the door body 100 is unfolded or the door table 610 or door cabinet 620 is unfolded after the housed seat 300 is unfolded, the passenger may more effectively use the vehicle for various purposes in the outdoor space of the vehicle.

Meanwhile, in the vehicle including the multi-functional door according to an embodiment of the present disclosure, as the seat cushion of the housed seat 300 slides forward in a state where the housed seat 300 is unfolded, the slope of the seatback is changed, such that a reclining seat may be implemented. As the seat cushion of the housed seat 300 slides forward to the outside of the vehicle, a lower end portion of the seatback of the housed seat 300 slides forward together with the seat cushion, and as a result, the slope of the seatback is changed. Therefore, the passenger may adjust the slope of the seatback as he/she prefers by sliding the seat cushion forward. In this case, as the housed seat 300 protrudes forward, the housed seat 300 and the door seat 200 may interfere with each other. However, such an interference may be solved by extending the connecting portion 110 of the door body 100.

In the vehicle including the multi-functional door according to an embodiment of the present disclosure, the housed seat 300 may be housed in the floor of the vehicle and unfolded to be used. However, a second-row seat or third-row seat facing the front of the vehicle may move toward the door body 100 of the vehicle, and rotate to face the door body 100, such that the second-row seat or third-row seat may also be used like the housed seat 300.

FIG. 6 is a view illustrating a state where a housed table is unfolded in the vehicle including the multi-functional door according to an embodiment of the present disclosure. In the vehicle including the multi-functional door according to an embodiment of the present disclosure, a housed table 400 is provided in the floor of the indoor space of the vehicle. The housed table 400 is housed in or unfolded from the floor, and may be arranged to face the door body 100 of the vehicle when being unfolded. The housed table 400 may be housed in the floor, and may protrude upward from the floor and then protrude forward to the door body 100 of the vehicle as necessary. Therefore, the passenger may sit on the housed seat 300 or door seat 200, and conveniently use the housed table 400 inside or outside the vehicle.

In the vehicle including the multi-functional door according to an embodiment of the present disclosure, a tailgate is implemented by two multi-functional doors arranged as double doors. The multi-functional doors may rotate to be opened or closed in the transverse direction at a rear side of the vehicle. Specifically, in a case where two multi-functional doors are arranged as double doors in the vehicle including the multi-functional door, and the multi-functional doors rotate to be opened in the transverse direction, two multi-functional doors may make an isolated space outside the vehicle by partially blocking the outdoor space of the vehicle, such that the passenger may perform various activities by connecting the indoor space of the vehicle and the expanded outdoor space.

For example, in a case where two multi-functional doors are opened, and the door seat 200, the housed seat 300, and the housed table 400 are unfolded, multiple passengers may have tea time or eat together, and in a case where the housed seat 300 and the housed table 400 are unfolded and the door table 610 or door cabinet 620 of the door body 100 is unfolded, the vehicle may be used as a mobile bar or home bar, a rest area, a convenience room, an open type café, or the like.

With the vehicle including the multi-functional door according to an embodiment of the present disclosure, it is possible to conveniently make a necessary space for a passenger's purpose in the outdoor space of the vehicle, and the vehicle may not only be simply utilized as a transportation, but also be used for connection to the outdoor space or for assisting in outdoor activities.

With the multi-functional door and the vehicle including the same according to the present disclosure, the multi-functional door in which the door body in which the seat is embedded is opened and the seat is unfolded at the outside of the vehicle may be utilized, and the multi-functional door is opened to connect an indoor space of the vehicle and an outdoor space of the vehicle, such that a passenger may use a more widely expanded space for various purposes.

Although the present disclosure has been shown and described with respect to specific embodiments, it will be obvious to those skilled in the art that the present disclosure may be variously modified and altered without departing from the spirit and scope of the present disclosure as defined by the following claims.

What is claimed is:

1. A multi-functional door for a vehicle comprising:
a door body disposed on one side of the vehicle and configured to be open or closed, wherein the door body has:
an inner side surface facing an indoor space of the vehicle; and
an outer side surface facing the outside of the vehicle; and
a door seat coupled to the inner side surface of the door body and configured to be stored in or unfolded from the door body,
wherein a door body support is disposed on a lower end portion of the door body, the door body support is configured to be enclosed in or unfolded from the door body, and
wherein, when the door body support is unfolded in a state where the door body is opened, a lower end of the door body support is supported by the ground to support a load of the door body.

2. The multi-functional door of claim 1, wherein the door seat is configured to be unfolded as a seat cushion rotates downward, and a seatback is configured to be disposed on the inner side surface of the door body after the door seat is unfolded.

3. The multi-functional door of claim 2, wherein, as the seat cushion of the door seat slides forward in a state where the door seat is unfolded, a slope of the seatback is changed to be configured as a reclining seat.

4. The multi-functional door of claim 2, wherein a door seat support is disposed on the seat cushion of the door seat and is configured to be housed in or unfolded from the seat cushion, and
wherein, when the door seat support is unfolded in a state where the door seat is unfolded, a lower end of the door seat support is configured to be supported by the ground to support a load of the door seat.

5. The multi-functional door of claim 1, wherein a connecting portion connecting the door body and a vehicle body is disposed at an end of the door body that faces the vehicle body, and
wherein the door body is configured to rotate to be opened or closed in a transverse direction of the vehicle based on the connecting portion.

6. The multi-functional door of claim 5, wherein the connecting portion is extended toward an outside of the vehicle in a state where the door body is opened, such that a position of the door body or door seat becomes distant from the vehicle.

7. A vehicle including a multi-functional door, which includes: a door body disposed on one side of the vehicle and configured to be open or closed, wherein the door body has an inner side surface facing an indoor space of the vehicle and an outer side surface facing the outside of the vehicle; and a door seat coupled to the inner side surface of the door body and configured to be stored in or unfolded from the door body, the vehicle comprising a housed seat enclosed in a floor of an indoor space of the vehicle, or unfolded from the floor,
wherein the housed seat is arranged to face the door body of the vehicle when being unfolded, wherein a door body support is disposed on a lower end portion of the door body, the door body support is configured to be enclosed in or unfolded from the door body, and wherein, when the door body support is unfolded in a state where the door body is opened, a lower end of the door body support is supported by the ground to support a load of the door body.

8. The vehicle of claim 7, wherein the housed seat is configured to be unfolded as a seatback housed in the floor rotates upward, and a seat cushion is configured to be disposed on the floor after the housed seat is unfolded.

9. The vehicle of claim 8, wherein, as the seat cushion of the housed seat slides forward in a state where the housed seat is unfolded, a slope of the seatback is changed to be configured as a reclining seat.

10. The vehicle of claim 7, further comprising a housed table disposed in the floor of the indoor space of the vehicle, wherein the housed table is configured to be housed in or unfolded from the floor and arranged to face the door body of the vehicle when being unfolded.

11. The vehicle of claim 7, wherein the multi-functional door includes two multi-functional doors arranged as double doors, and the two multi-functional doors are configured to rotate to be opened or closed in a transverse direction at a rear side of the vehicle.

* * * * *